United States Patent
Mickler et al.

(10) Patent No.: US 11,581,152 B2
(45) Date of Patent: Feb. 14, 2023

(54) SYSTEMS AND METHODS FOR A DISCONNECT SWITCH ASSEMBLY HAVING A REVERSIBLE FUSE SUPPORT BLOCK

(71) Applicant: Rockwell Automation Technologies, Inc., Mayfield Heights, OH (US)

(72) Inventors: Kurt R. Mickler, Waukesha, WI (US); Douglas R. Berger, Milwaukee, WI (US); Robert G. Rushmer, Wauwatosa, WI (US); Ganesh B. Gaikwad, Milwaukee, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 98 days.

(21) Appl. No.: 17/332,255

(22) Filed: May 27, 2021

(65) Prior Publication Data

US 2021/0287859 A1 Sep. 16, 2021

Related U.S. Application Data

(62) Division of application No. 16/911,479, filed on Jun. 25, 2020, now Pat. No. 11,049,669, which is a division of application No. 16/241,202, filed on Jan. 7, 2019, now Pat. No. 10,720,286.

(51) Int. Cl.
*H01H 9/10* (2006.01)
*H01H 85/20* (2006.01)
*G05B 19/05* (2006.01)
*G05B 19/418* (2006.01)

(52) U.S. Cl.
CPC .......... *H01H 9/10* (2013.01); *H01H 85/2015* (2013.01); *G05B 19/056* (2013.01); *G05B 19/4185* (2013.01); *G05B 2219/21092* (2013.01)

(58) Field of Classification Search
CPC .... H01H 9/10; H01H 85/2015; G05B 19/056; G05B 19/4185; G05B 2219/21092
USPC ........................................................ 361/622
See application file for complete search history.

(56) References Cited

U.S. PATENT DOCUMENTS

| 3,744,003 | A | | 7/1973 | Dipace |
| 4,432,594 | A | * | 2/1984 | Daggett ............... H01H 85/205 439/698 |
| 4,846,733 | A | | 7/1989 | Baisz et al. |
| 5,167,541 | A | | 12/1992 | Alves et al. |
| 5,328,392 | A | | 7/1994 | Lin et al. |
| 5,551,894 | A | | 9/1996 | Lin et al. |

(Continued)

*Primary Examiner* — Anatoly Vortman
(74) *Attorney, Agent, or Firm* — Fletcher Yoder, P.C.

(57) ABSTRACT

A reversible fuse support block includes a molding, a terminal, and a fuser interface. The molding may be installed within a housing in a first position and a second position, wherein the second position is rotated 180 degrees relative to the first position. The terminal couples to the molding and includes a plurality of apertures disposed in a pattern. The fuse interface receives a first end of a fuse. The fuse interface couples to the terminal in a first arrangement and a second arrangement such that when the fuse interface is installed in the first arrangement and the molding is installed in the first position, the fuse interface is disposed in substantially the same position relative to a corresponding fuse interface on a fuse support block as when the fuse interface is installed in the second arrangement and the molding is installed in the second position.

20 Claims, 11 Drawing Sheets

(56) References Cited

U.S. PATENT DOCUMENTS

| | | | |
|---|---|---|---|
| 5,618,209 A * | 4/1997 | Lin | H01H 85/205 |
| | | | 439/620.29 |
| 6,004,159 A * | 12/1999 | Liang | H01R 11/22 |
| | | | 439/620.27 |
| 6,162,097 A | 12/2000 | Liang | |
| 6,326,878 B1 | 12/2001 | Liang | |
| 6,504,468 B2 | 1/2003 | Lee et al. | |
| 6,577,495 B2 | 6/2003 | West | |
| 6,746,279 B1 | 6/2004 | Lopez | |
| 6,753,754 B1 | 6/2004 | Black et al. | |
| 7,942,706 B1 | 5/2011 | McSweyn et al. | |
| 8,026,786 B2 | 9/2011 | Darr et al. | |
| 2003/0032332 A1* | 2/2003 | Liang | H01H 85/205 |
| | | | 439/620.27 |
| 2008/0020647 A1* | 1/2008 | Carter | H01R 13/68 |
| | | | 439/620.27 |
| 2010/0039789 A1 | 2/2010 | Mason | |
| 2010/0279555 A1* | 11/2010 | Azad | H01R 13/6215 |
| | | | 439/676 |
| 2015/0229065 A1* | 8/2015 | Buehman | H02H 9/04 |
| | | | 361/118 |

\* cited by examiner

SYSTEMS AND METHODS FOR A DISCONNECT SWITCH ASSEMBLY HAVING A REVERSIBLE FUSE SUPPORT BLOCK

CROSS-REFERENCE TO RELATED APPLICATION

This application is a divisional of and claims priority to U.S. patent application Ser. No. 16/911,479, which was filed on Jun. 25, 2020 and is a divisional of and claims priority to U.S. patent application Ser. No. 16/241,202, which was filed on Jan. 7, 2019, now U.S. Pat. No. 10,720,286, which are incorporated by reference herein in their entirety for all purposes.

BACKGROUND

The present disclosure relates generally to disconnect switch assemblies. More specifically, the present disclosure relates to disconnect switch assemblies having fuse support blocks that can be installed in multiple configurations.

Industrial automation systems may be used to provide automated control of one or more actuators. Specifically, a motor control center may receive power from a power source and output a conditioned power signal to an actuator to control movement of the actuator. In some embodiments, the motor control center may include an industrial automation motor starter and a disconnect switch to disconnect the power source from the industrial automation motor starter and the actuator. With the industrial automation motor starter and the actuator disconnected from the power source, maintenance, diagnostics, repair work, etc. may be performed without the risk of the industrial automation motor starter and/or the actuator unexpectedly powering up. In some applications, space may be at a premium. Accordingly, it may be desirable to reduce or minimize a footprint of the disconnect switch assembly.

BRIEF DESCRIPTION

In one embodiment, a reversible fuse support block includes a molding, a terminal, and a fuse interface. The molding may be installed within a housing in a first position and a second position, wherein the second position is rotated 180 degrees relative to the first position. The terminal couples to the molding and includes a plurality of apertures disposed in a pattern. The fuse interface receives a first end of a fuse. The fuse interface couples to the terminal in a first arrangement and a second arrangement such that when the fuse interface is installed in the first arrangement and the molding is installed in the first position, the fuse interface is disposed in substantially the same position relative to a corresponding fuse interface on a fuse support block as when the fuse interface is installed in the second arrangement and the molding is installed in the second position.

In another embodiment, a method of installing a fuse support block includes coupling a terminal to a molding, coupling a fuse interface to the terminal, and installing the molding in a housing. The molding can be installed within the housing in a first position and a second position. The terminal includes a plurality of apertures disposed in a pattern. The fuse interface receives a first end of a fuse. The fuse interface can couple to the terminal in a first arrangement and a second arrangement such that when the fuse interface is installed in the first arrangement and the molding is installed in the first position, the fuse interface is disposed in substantially the same position relative to a corresponding fuse interface on a fuse support block as when the fuse interface is installed in the second arrangement and the molding is installed in the second position.

In yet another embodiment, an industrial automation system includes a power supply, an industrial automation motor starter that receives power from the power supply, and a disconnect switch assembly that electrically couples the power supply to the industrial automation motor starter. The disconnect switch assembly includes a housing, a fuse block, and a reversible fuse support block. The fuse block is disposed within the housing and includes a first fuse interface that receives a first end of a fuse. The reversible fuse support block is disposed within the housing and includes a molding, a terminal, and a fuser interface. The molding may be installed within the housing in a first position and a second position, wherein the second position is rotated 180 degrees relative to the first position. The terminal couples to the molding and includes a plurality of apertures disposed in a pattern. The fuse interface receives a second end of the fuse. The fuse interface couples to the terminal in a first arrangement and a second arrangement such that when the fuse interface is installed in the first arrangement and the molding is installed in the first position, the fuse interface is disposed in substantially the same position relative to the first fuse interface as when the fuse interface is installed in the second arrangement and the molding is installed in the second position.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
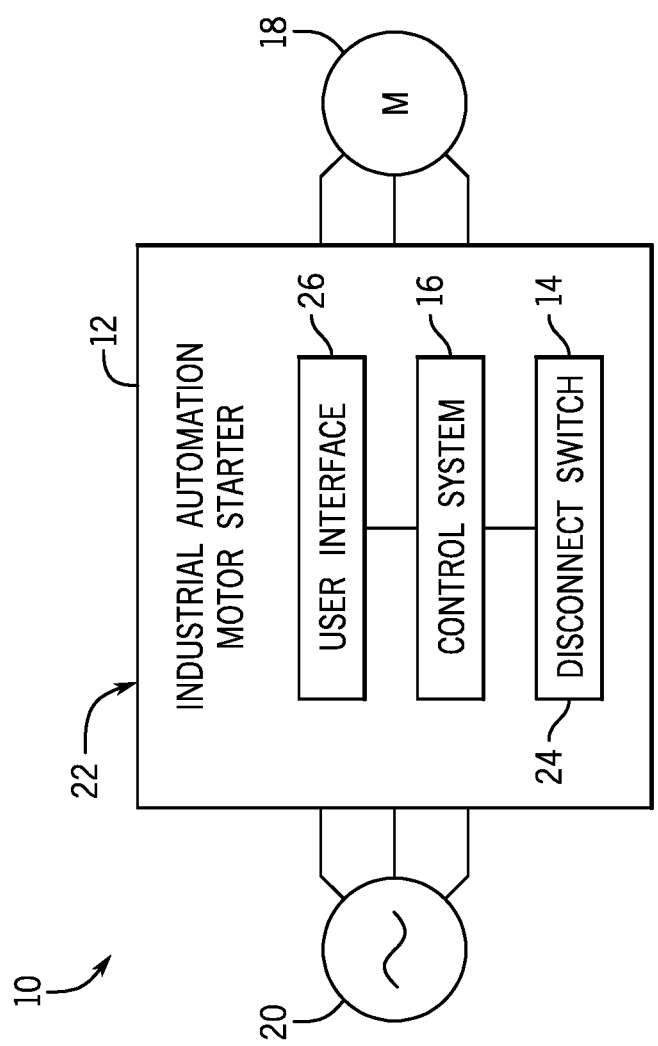
FIG. 1 illustrates a perspective view of an industrial automation system, including a motor control center having a disconnect switch assembly and an industrial automation motor starter, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An industrial automation system may utilize a motor control center, including an industrial automation motor starter, to receive power from a power source and output a conditioned power signal to an actuator to control movement of the actuator. A disconnect switch assembly disposed within the motor control center may electrically couple the power source to the industrial automation motor starter and disconnect the power source from the industrial automation motor starter and the actuator. After the power source is disconnected from the industrial automation motor starter, maintenance, diagnostics, repair work, etc. may be performed without the risk of the industrial automation motor starter and/or the actuator unexpectedly powering up. In some applications, physical space may be limited in a housing or enclosure of the motor control center. For example, a customer or designer of the industrial automation system may wish to reduce the footprint of the disconnect switch assembly to design a smaller housing, or to fit the disconnect switch assembly into a fixed-size housing that is smaller than was previously possible.

The disclosed techniques include a reversible fuse support block for a disconnect switch assembly that can be mounted in a first configuration having a first-sized footprint (e.g., vertical and horizontal dimensions), or a second configuration having a reduced footprint. Specifically, the fuse support block includes a molding having two sets of mounting holes that allow the molding to be installed within the housing in two different positions (e.g., for first configuration and second configuration). The fuse support block includes one or more terminals, each having a pattern of apertures, which mount to the molding. One or more fuse interfaces couple to respective terminals in two possible positions, a first position for the first configuration, and a second position for the second configuration. When the fuse interfaces are installed in the first position and the molding is installed in the first position, the fuse interfaces are disposed in substantially the same position relative to corresponding fuse interfaces on a fuse support block as when the fuse interfaces are installed in the second position and the molding is installed in the second position. Accordingly, when the fuse support block is installed in the second position, electrical lines coupling the fuse support block to the power source extend from the fuse support block underneath the fuses rather than extending outward from the side of the fuse support block opposite the fuses. Thus, the second configuration reduces the footprint of the disconnect switch assembly relative to the first configuration.

By way of introduction, FIG. 1 is a perspective view of an industrial automation system 10, including an industrial automation motor starter 12, a disconnect switch 14, a control system 16, and a motor 18. As shown, the industrial automation system 10 may also include, or be coupled to, a power source 20. In the instant embodiment, the industrial automation motor starter 12, the disconnect switch 14, and the control system 16 are disposed in a motor control center 22. The motor control center may include a cabinet or some other enclosure for housing various components of the industrial automation system 10, such as the industrial automation motor starter 12, the disconnect switch 14, and the control system 16. The industrial automation motor starter 12 may include, for example, an across the line starter or direct on line (DOL) starter, a solid state motor starter (e.g., a motor drive or a reduced voltage soft starter), etc. In some embodiments, the disconnect switch 14 may include its own disconnect switch housing 24 within the motor control center 22. However, embodiments are also envisaged in which the industrial automation motor starter 12 and the disconnect switch 14 are disposed in different housings or enclosures. The motor control center 22 may include or receive a user interface 26, such as a human machine interface (HMI) 26.

As described further below with regard to FIG. 2, the industrial automation motor starter 12 may be adapted to receive three-phase alternating-current (AC) power from the power supply 20 and to convert a fixed frequency AC input power from the power supply 20 to controlled frequency AC output power that may be applied to the motor 18, or other suitable electrical component. The power supply 20 may include a generator or an external power grid. A variety of components or devices may be disposed within the industrial automation motor starter 12 and may be used in the operation and control of a load such as the motor 18.

Figure 2:
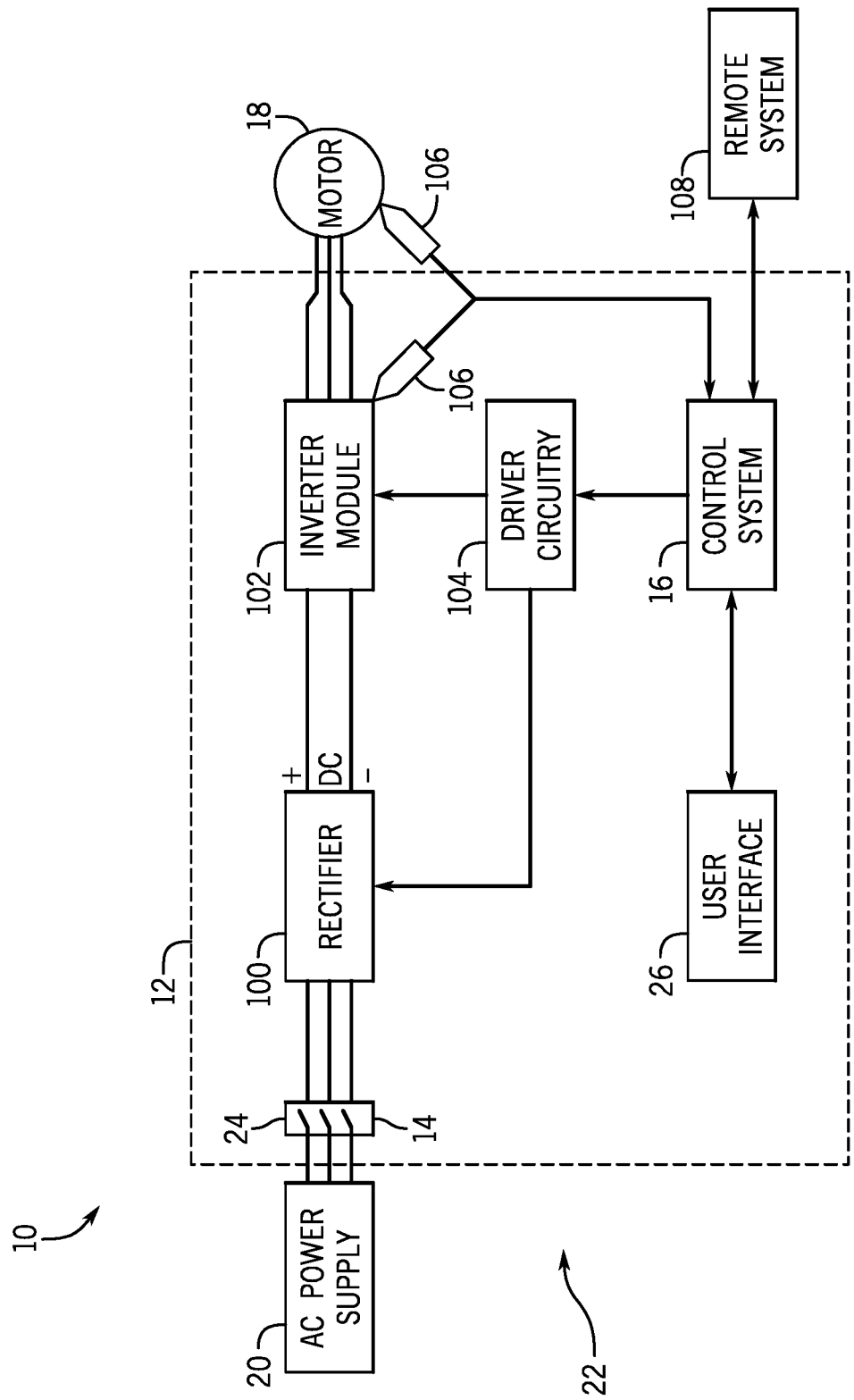
FIG. 2 illustrates a block diagram of example component parts of the motor control center of FIG. 1, in accordance with embodiments presented herein.

Keeping this in mind, FIG. 2 illustrates a block diagram of the industrial motor control center 22 and provides additional details regarding the make-up of the motor control center 22. As illustrated, the industrial automation motor starter 12 may include a rectifier 100 that receives a constant frequency three-phase AC voltage waveform from the power supply 20. The rectifier 100 may perform full wave rectification of the three-phase AC voltage waveform, outputting a direct current (DC) voltage to an inverter module 102. Although the AC power supply 20 has been described above as providing a constant frequency three-phase AC voltage waveform, it should be noted that the AC power supply 20 is not limited to providing a three-phase AC voltage waveform. Instead, it should be understood that the AC power supply 20 may also provide different waveforms such as a six-phase AC voltage waveform or the like.

The inverter module 102 may accept the positive and negative lines of the DC voltage from the rectifier 100 and may output a discretized three-phase AC voltage waveform at a desired frequency, independent of the frequency of AC power supply 20. Driver circuitry 104 may provide the inverter module 102 with appropriate signals, enabling the inverter module 102 to output the AC voltage waveform. The resulting AC voltage waveform may thereafter drive a load, such as the motor 18.

The control system 16 may be coupled to the driver circuitry 104 and may be programmed to provide signals to the driver circuitry 104 for driving the motor 18. In certain embodiments, the control system 16 may be programmed according to a specific configuration desired for a particular application. For example, the control system 16 may be programmed to respond to external inputs, such as reference signals, alarms, command/status signals, etc. The external inputs may originate from one or more relays or other electronic devices. The programming of the control system 16 may be accomplished through software configuration or firmware code that may be loaded onto an internal memory of the control system 16 or programmed via the user interface 26 of the industrial automation motor starter 12. The firmware of the control system 16 may respond to a defined set of operating parameters. The settings of the various operating parameters determine the operating characteristics of the industrial automation motor starter 12. For example, various operating parameters may determine the speed or torque of the motor 18 or may determine how the industrial automation motor starter 12 responds to the various external inputs. As such, the operating parameters may be used to map control variables within the industrial automation motor starter 12 or to control other devices communicatively coupled to the industrial automation motor starter 12. These variables may include, for example, speed presets, feedback types and values, computational gains and variables, algorithm adjustments, status and feedback variables, and programmable logic controller (PLC) like control programming.

The industrial automation motor starter 12 and the motor 18 may also include one or more sensors 106 for detecting operating temperatures, voltages, currents, etc. With feedback data from the sensors 106, the control system 16 may keep detailed track of the various conditions under which the inverter module 102 may be operating. For example, the feedback data may include conditions such as actual motor speed, voltage frequency, power quality, alarm conditions, etc. The feedback data may then be used to control other devices such as the disconnect switch 14, which is described in greater detail below.

In some embodiments, the industrial automation motor starter 12 may be communicatively coupled to one or more peripheral devices. For example, in one embodiment, the control system 16 may be communicatively coupled to a remote system 108, which may be used to control the industrial automation motor starter 12, the motor 18, or the disconnect switch 14 via the control system 16 from a remote location away from where the industrial automation system 10 is located. In certain embodiments, the control system 16 may be communicatively coupled to the remote system 108 via a wireless network, a local area network, the Internet, or the like. However, it should be noted that the control system 16 may be communicatively coupled to the remote system 108 via a hard-wired connection, such as an Ethernet connection or the like.

To isolate the industrial automation motor starter 12 from the AC power supply 20, the disconnect switch 14 may be opened, thereby removing the input AC voltage from the industrial automation motor starter 12. As such, the disconnect switch 14 may include mechanical components that enable one or more poles of the disconnect switch 14 to open (i.e., break a circuit) and close. In this way, the disconnect switch 14 may protect the industrial automation motor starter 12, the motor 18, and other downstream devices when the power from the AC power supply 20 may cause damage to the industrial automation system 10. For example, the disconnect switch 14 may open when the AC voltage from the AC power supply 20 is unbalanced, experiencing a fault, experiencing under-voltage or over-voltage conditions, increased levels of harmonics, or the like. In certain embodiments, the disconnect switch 14 may be a circuit breaker, a molded case switch, or the like. The disconnect switch 14 may be a three-pole switch that may disconnect the three-phase AC power supply 20 from the industrial automation motor starter 12. However, it should be noted that the disconnect switch 14 is not limited to a three-pole switch and may include any number of poles.

Figure 3:
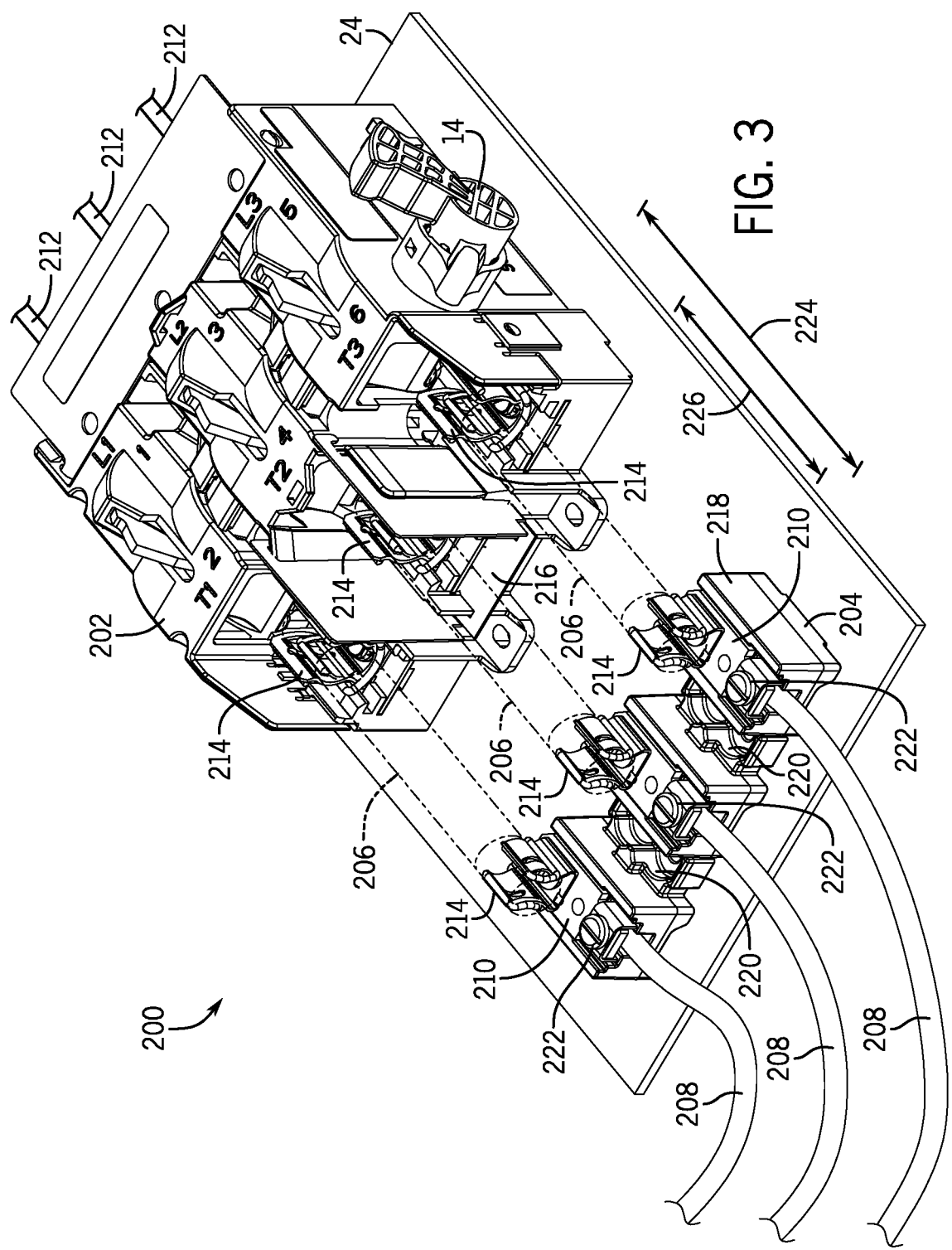
FIG. 3 illustrates a perspective view of an embodiment of the disconnect switch assembly of the industrial automation system shown in FIGS. 1 and 2 installed in a first configuration, in accordance with embodiments presented herein.

FIG. 3 is a perspective view of an embodiment of a disconnect switch assembly 200, which includes the disconnect switch 14 of the industrial automation system 10 shown in FIGS. 1 and 2. The disconnect switch assembly 200 includes a fuse block 202, which houses the disconnect switch 14, and a fuse support block 204 installed in a first configuration. As shown, the fuse block 202 and the fuse support block 204 are coupled to the housing 24 and spaced apart from one another. First, second, and third fuses 206 extend from the fuse support block 204 to the fuse block 202. The fuses 206 are represented in FIG. 3 by dotted lines for clarity. First, second, and third electrical lines 208, one for each phase of power, deliver power signals from the power supply 20 to first, second, and third respective terminals 210 of the fuse support block 204. The power signal for each phase conducts through the respective fuse 206 to the fuse block 202. If the current through one of the fuses 206 exceeds a threshold value, a conductive element in the fuse 206 opens, breaking the circuit and preventing the conduction of electricity through the fuse 206. The fuse block 202 includes the disconnect switch 14, which may be a three-pole switch that connects and disconnects the industrial automation motor starter 12 from the power supply 20. As previously described, the disconnect switch 14 may be manually actuated, actuated by the control system 16, or actuated in some other fashion. When the disconnect switch 14 is closed, the power signal conducts through the fuse block 202 and to the industrial automation motor starter 12 via one or more electrical lines 212. When the disconnect switch 14 is open, the power signal does not conduct through the disconnect switch assembly 200.

As shown in FIG. 3, the fuse block 202 and the fuse support block 204 each include a plurality of fuse interfaces 214. The fuse interfaces 214 may provide a physical coupling between one end of the fuse 206 and the fuse block 202 or the fuse support block 204, capturing the fuse 206, as well as an electrical coupling between the fuse 206 and the fuse block 202 or the fuse support block 204. As described in more detail below, the fuse interface 214 may be a clip, a V-block, or some other kind of interface. Further, in some embodiments, blade style fuses 206 may be mounted directly to the terminals 210 without using V-blocks.

Further, in some embodiments, the fuse block 202 and/or the fuse support block 204 may include fuse insulation 216 disposed about one or more of the fuse interfaces 214 to insulate the fuses 206 from one another and to achieve appropriate creepage and clearance distances. In the instant embodiment, the fuse insulation 216 is shown disposed about the central terminal of the fuse block 202, however, it should be understood that any of the terminals of the fuse block 202 or the fuse support block 204 may be outfitted with fuse insulation 216.

The embodiment of the disconnect switch assembly 200 shown in FIG. 3 is for a 30 Amp disconnect switch assembly 200. However, it should be understood that similar disconnect switch assemblies 200 designed for other amperages are also envisaged. For example, a 60 Amp disconnect switch assembly 200 is described below with regard to FIGS. 8-10 and a 100 Amp disconnect switch assembly 200 is described below with regard to FIGS. 11-13. However, the 30 Amp, 60 Amp, and 100 Amp embodiments described herein are merely examples and not intended to be limiting. Accordingly, the disclosed techniques may be extended to disconnect switch assemblies 200 rated for any suitable amperage rating other than 30 Amps, 60 Amps, or 100 Amps.

As shown in FIG. 3, when the fuse support block 204 is installed in the first configuration, the electrical lines 208 couple to the fuse support block 204 on a first side of the fuse support block 204 that faces away from the fuse block 202, such that the electrical lines 208 extend outward from the fuse support block 204 opposite the direction of the fuse block 202. However, where space is limited, a user or designer of the industrial automation system 10 may wish to minimize the size and/or footprint of the disconnect switch assembly 200 and/or its housing 24. Alternatively, the user or designer of the industrial automation system 10 may wish to fit the disconnect switch assembly 200 into a fixed sized housing 24 in which the disconnect switch assembly 200 with the fuse support block 204 installed in the first configuration, as shown in FIG. 3, would not fit. Accordingly, the fuse support block 204 may be designed to be reversible such that the fuse support block 204 may be reconfigured with the same parts and installed in a second position such that the electrical lines 208 couple to the fuse support block 204 on a side of the fuse support block 204 that faces the fuse block 202, such that the electrical lines 208 extend outward from the fuse support block 204 toward the fuse block 202, thereby preserving space occupied by the electrical lines 208 extending outward from the fuse support block 204, away from fuse block 202, when installed in the first configuration.

Specifically, the fuse support block 204 includes a molding 218, which acts as a base for the fuse support block 204. The molding 218 may be a single part or a multi-part component that is manufactured (e.g., molded, cast, machined, etc.) from a non-conductive material. The molding 218 may include a first set of mounting holes 220 for mounting the molding 218 to the housing 24 in the first configuration and a second set of mounting holes 220 for mounting the molding 218 to the housing 24 in the second configuration.

The fuse support block 204 also includes the first, second, and third terminals 210, one for each phase of power. The terminals 210 are generally rectangular components made from a conductive material and that provide an electrical connection between the electrical lines 208 and the fuse interfaces 214. As described in more detail below, the terminals 210 may include a pattern of holes and/or apertures to facilitate coupling to the molding 218, the fuse interfaces 214, and one or more connection points 222 that couple the electrical lines 208 to the fuse support block 204. The hole pattern in each of the terminals 210 allows the respective fuse interfaces 214 to be mounted to the terminals 210 and the molding 218 in two different positions, approximately 180 degrees offset from one another, one corresponding to the first configuration and one corresponding to the second configuration. That is, the two different fuse interface 214 mounting positions allow the components of the fuse support block 204 other than the fuse interfaces 214 (e.g., the molding 218, the terminals 210, and the connection points 222) to be mounted in the first configuration or the second configuration, approximately 180 degrees offset from one another. The fuse interfaces 214 are in approximately the same position relative to the respective fuse interfaces 214 of the fuse block 202 in both configurations. For example, a distance 224 between the fuse interfaces 214 of the fuse block 202 and the fuse interfaces 214 of the fuse support block 204 may be the same when the fuse support block 204 is installed in either the first configuration or the second configuration. However, a distance 226 between the fuse block 202 and the fuse support block 204 may be different when the fuse support block 204 is installed in the first configuration and when the fuse support block 204 is installed in the second configuration.

Figure 4:
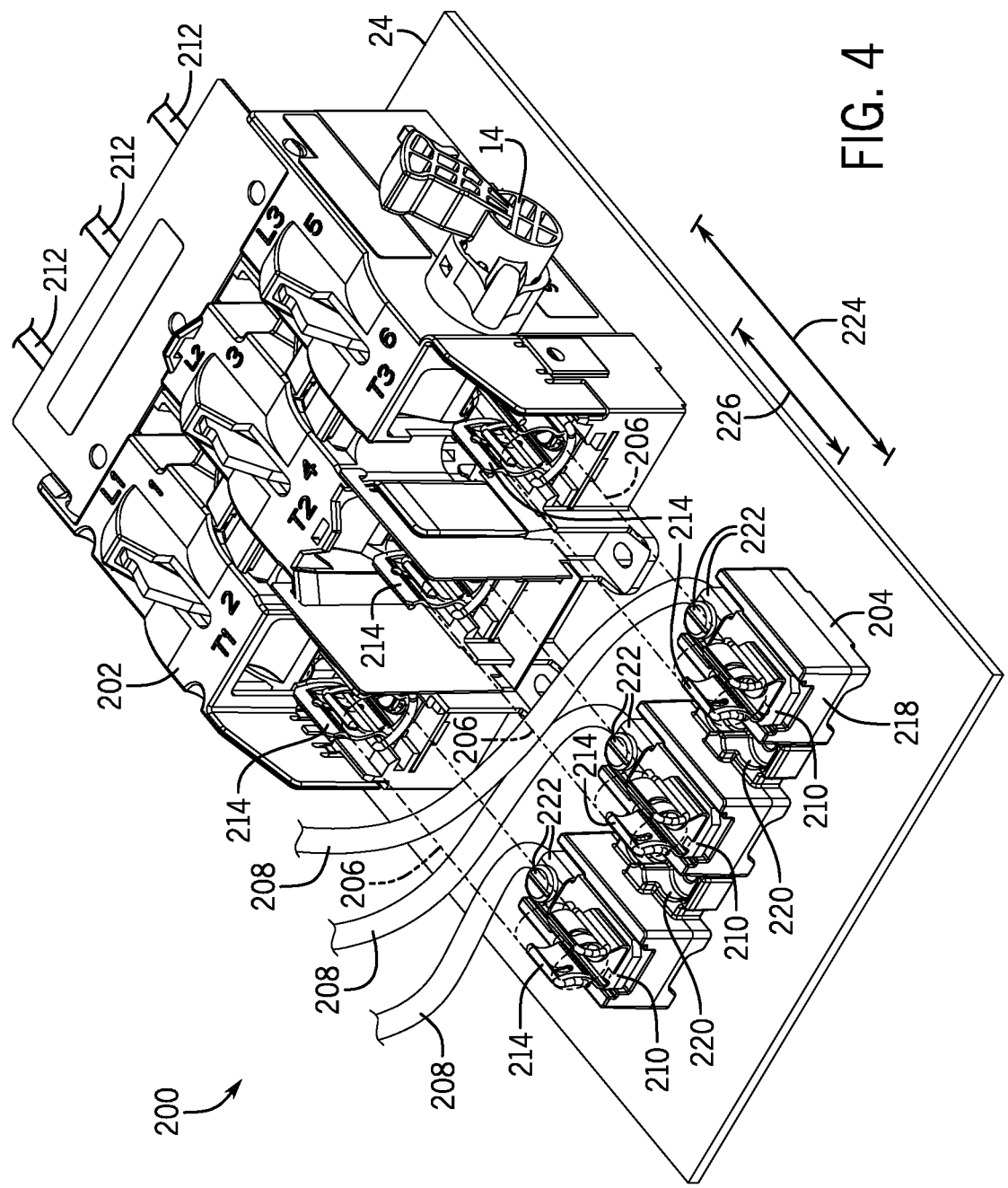
FIG. 4 illustrates a perspective view of an embodiment of the disconnect switch assembly shown in FIG. 3 installed in an second configuration, in accordance with embodiments presented herein.

FIG. 4 is a perspective view of an embodiment of the disconnect switch assembly 200 of FIG. 3, with the fuse support block 204 installed in the second configuration. As illustrated in in FIG. 4, all of the components of the fuse support block 204 except for the fuse interfaces 214 (e.g., the molding 218, the terminals 210, and the connection points 222) have been rotated 180 degrees and mounted to the housing 24, via the mounting holes 220, corresponding to the second configuration. Accordingly, the electrical lines 208 may couple to the fuse support block 204 at the side that faces the fuse block 202, such that the electrical lines 208 extend from the fuse support block 204 substantially outward toward the fuse block 202, beneath the fuses 206. Further, though the distance 226 between the fuse block 202 and the fuse support block 204 is smaller in the second configuration than in the first configuration, the distance 224 between the fuse interfaces 214 of the fuse block 202 and the fuse interfaces 214 of the fuse support block 204 is substantially the same in the second configuration as it is in the first configuration. Accordingly, because the electrical lines 208 run between the fuse block 202 and the fuse support block 204, beneath the fuses 206, and the fuse support block 204 is mounted closer to the fuse block 202, the overall footprint of the disconnect switch assembly 200 is smaller in the second configuration than in the first configuration. Thus, the disconnect switch assembly 200 may be housed in a smaller housing 24 than was previously possible. For example, mounting the fuse support block 204 in the second configuration may allow a user or designer of the industrial automation system 10 to reduce the size of the housing 24, or utilize a fixed sized housing 24 of a smaller size than was previously possible.

Figure 5:
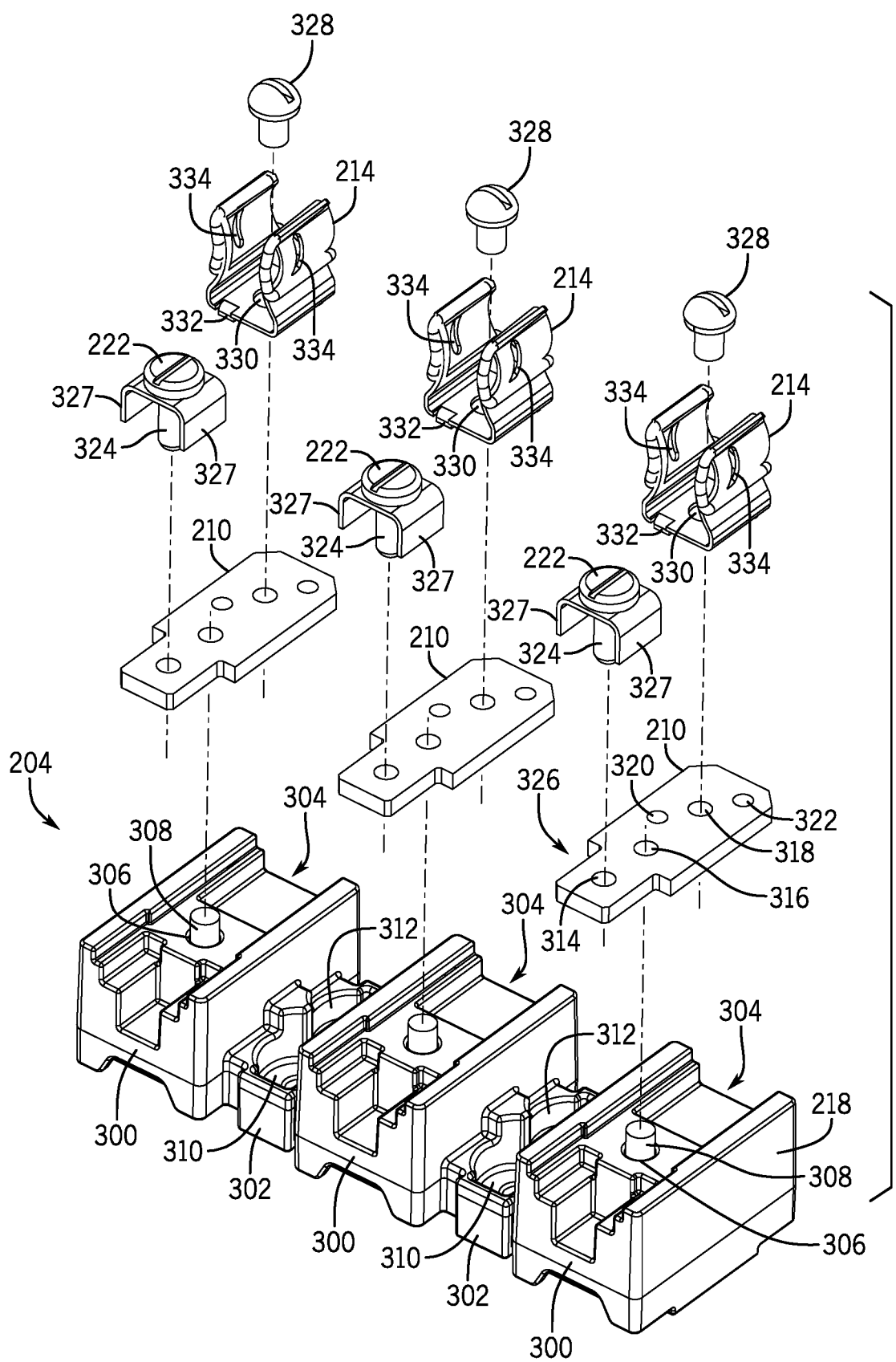
FIG. 5 illustrates an exploded perspective view of a 30 Amp fuse support block of the disconnect switch assembly shown in FIGS. 3 and 4, in accordance with embodiments presented herein.

FIG. 5 is an exploded perspective view of the 30 Amp fuse support block 204 of FIGS. 3 and 4. As illustrated, the fuse support block 204 includes the molding 218, three terminals 210, three fuse interfaces 214, and three connection points 222. In the instant embodiment, the molding 218 is made of a single part, molded from a non-conductive material, such as a polymer. However, embodiments are envisaged in which the molding 218 includes multiple parts, is made by some other process (e.g., casting, machining, etc.), is made of some other material, or a combination thereof. As previously discussed, the fuse support block 204 includes one terminal 210 per phase of power. Accordingly, because the illustrated embodiment is designed for use with a 3-phase power source, the molding includes first, second, and third blocks 300, one for each phase of power. The blocks 300 are coupled to one another by bridges 302 disposed between the blocks 300. Each block 300 may include a recess 304 dimensioned to receive one of the terminals 210 and an aperture 306 (e.g., through hole) through which a fastener 308 (e.g., bolt) may extend to couple the terminal 210 to the block 300. Each of the bridges 302 may include a first aperture 310 and a second aperture 312. In some embodiments, the first aperture 310 may receive a fastener to couple the molding 218 to the housing 24 in the first configuration and the second aperture 312 may receive the fastener to couple the molding 218 to the housing 24 in the second configuration. In other embodiments, the first aperture 310 may receive the fastener to couple the molding 218 to the housing 24 in the second configuration and the second aperture 312 may receive the fastener to couple the molding 218 to the housing 24 in the first configuration.

Each terminal 210 includes a pattern of apertures to facilitate coupling the terminal 210 to its respective block 300, coupling the connection point 222 and the electrical line to the terminal 210, and coupling the fuse interface 214 to the terminal 210. For example, each of the terminals 210 in FIG. 5 includes a first primary aperture 314, a second primary aperture 316, a third primary aperture 318, a first auxiliary aperture 320, and a second auxiliary aperture 322. The first primary aperture 314 may receive a fastener 324 that extends through the connection point 222 to couple the connection point 222 and the electrical line 208 to the terminal 210 and establish an electrical connection between the electrical line 208 and the terminal 210. In some embodiments, the terminal 210 may include notches 326 on one or both sides of the first primary aperture 314, such that one or more legs 327 of the connection point 222 may extend around the edge of the terminal 210, between the terminal 210 and the block 300. The second primary aperture 316 may receive the fastener 308 extending through the aperture 306 in the block 300 to couple the terminal 210 to the block 300. The third primary aperture 318 may receive a fastener 328 extending through an aperture 330 in the fuse interface 214 to couple the fuse interface 214 to the terminal 210. The first and second auxiliary apertures 320, 322 are may interface with detents or protrusions 332 on the fuse interface 214. The protrusions 332 may engage with the first and second auxiliary apertures 320, 322 to prevent the fuse interface 214 from rotating relative to the terminal 210 and/or to key the fuse interface 214 into the desired position.

The fuse interfaces 214 shown in FIG. 5 are a clip-type interface, in which the fuse 206 snaps into the fuse interface 214. In some embodiments, the fuse interfaces 214 may include slots 334 that interface with an annular lip of the fuse 206 to position the fuse 206 axially along an axis of the fuse 206.

Figure 6:
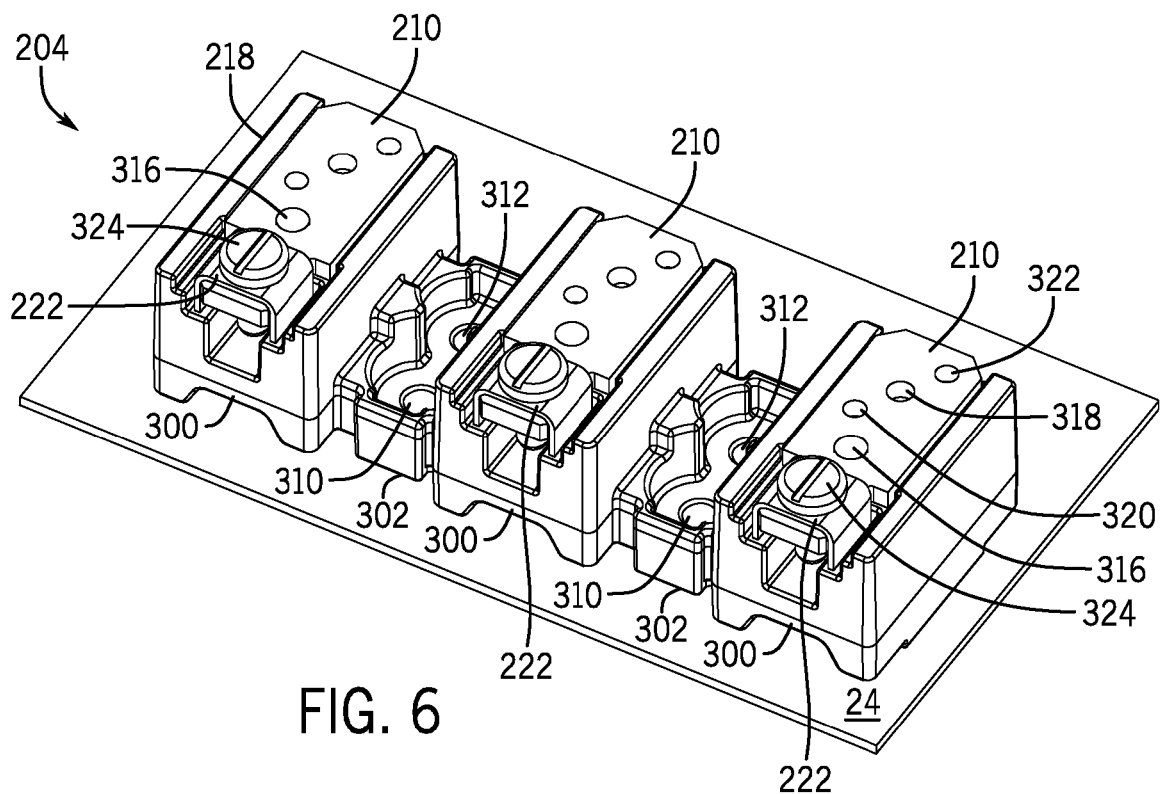
FIG. 6 illustrates a perspective view of the 30 Amp fuse support block shown in FIG. 5 installed in the first configuration, in accordance with embodiments presented herein.

FIG. 6 is a perspective view of the 30 Amp fuse support block 204 in the first configuration, without the fuse interfaces 214 shown for the sake of clarity. As shown, the terminals 210 are coupled to the molding 218 via the second primary aperture 316 of each terminal 210. The connection points 222 are then coupled to the respective terminal 210 via the fasteners 324 to couple the electrical lines 208 (not shown) to the respective terminals 210. The fuse support block 204 may be coupled to the housing 24 via fasteners extending through the first apertures 310 of the molding 218 and then engaging with the housing 24. As was previously shown in and described with regard to FIG. 3, when the fuse support block 204 is installed in the first configuration, the electrical lines 208 (not shown) extend outward from the fuse support block 204, opposite the direction of the fuse block 202 (not shown).

Figure 7:
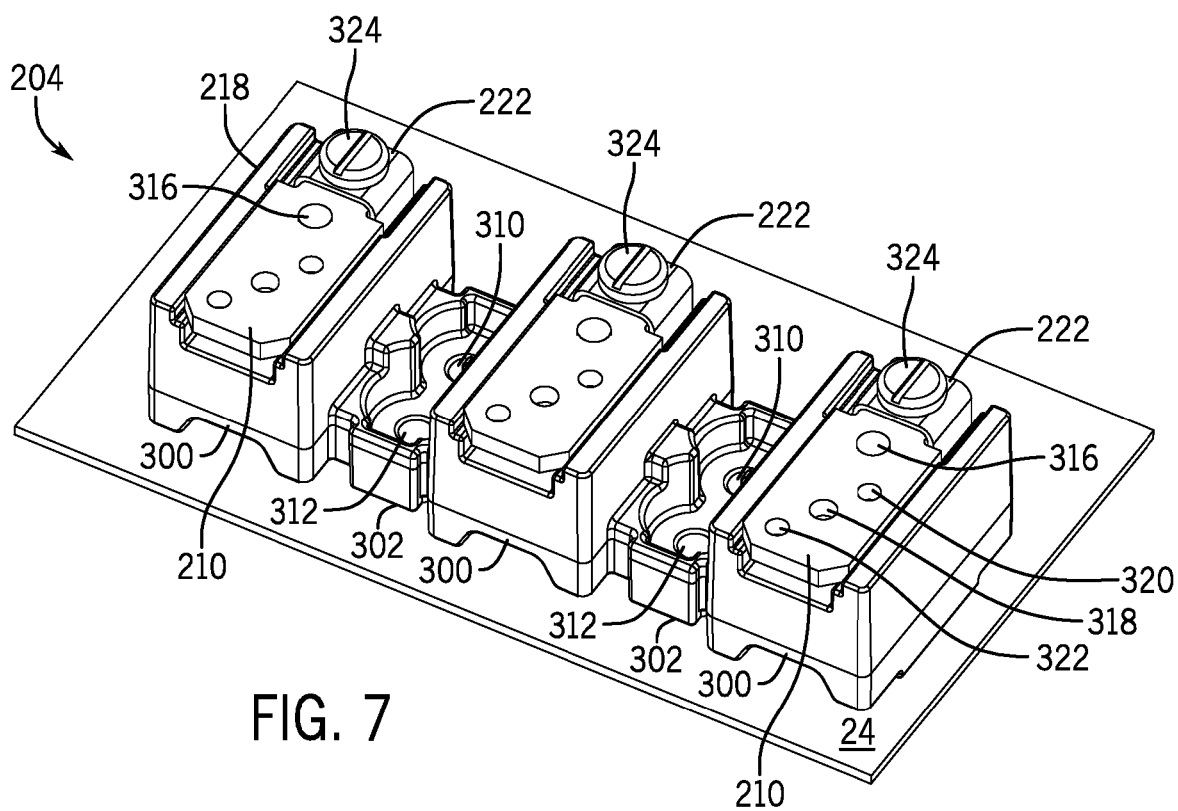
FIG. 7 illustrates a perspective view of the 30 Amp fuse support block shown in FIGS. 5 and 6 installed in the second configuration, in accordance with embodiments presented herein.

FIG. 7 is a perspective view of the 30 Amp fuse support block 204 in the second configuration, without the fuse interfaces 214 shown for the sake of clarity. Unlike the first configuration shown in FIG. 6, the fuse support block 204 may be coupled to the housing 24 via fasteners extending through the second apertures 312 of the molding 218 and then engaging with the housing 24. As was previously shown in and described with regard to FIG. 4, when the fuse support block 204 is installed in the second configuration, the electrical lines 208 (not shown) couple to the fuse support block 204 at the side that faces the fuse block 202 (not shown), such that the electrical lines 208 (not shown) extend from the fuse support block 204 substantially outward toward the fuse block 202, beneath the fuses 206, thus reducing the footprint of the disconnect switch assembly 200 relative to the first configuration.

Figure 8:
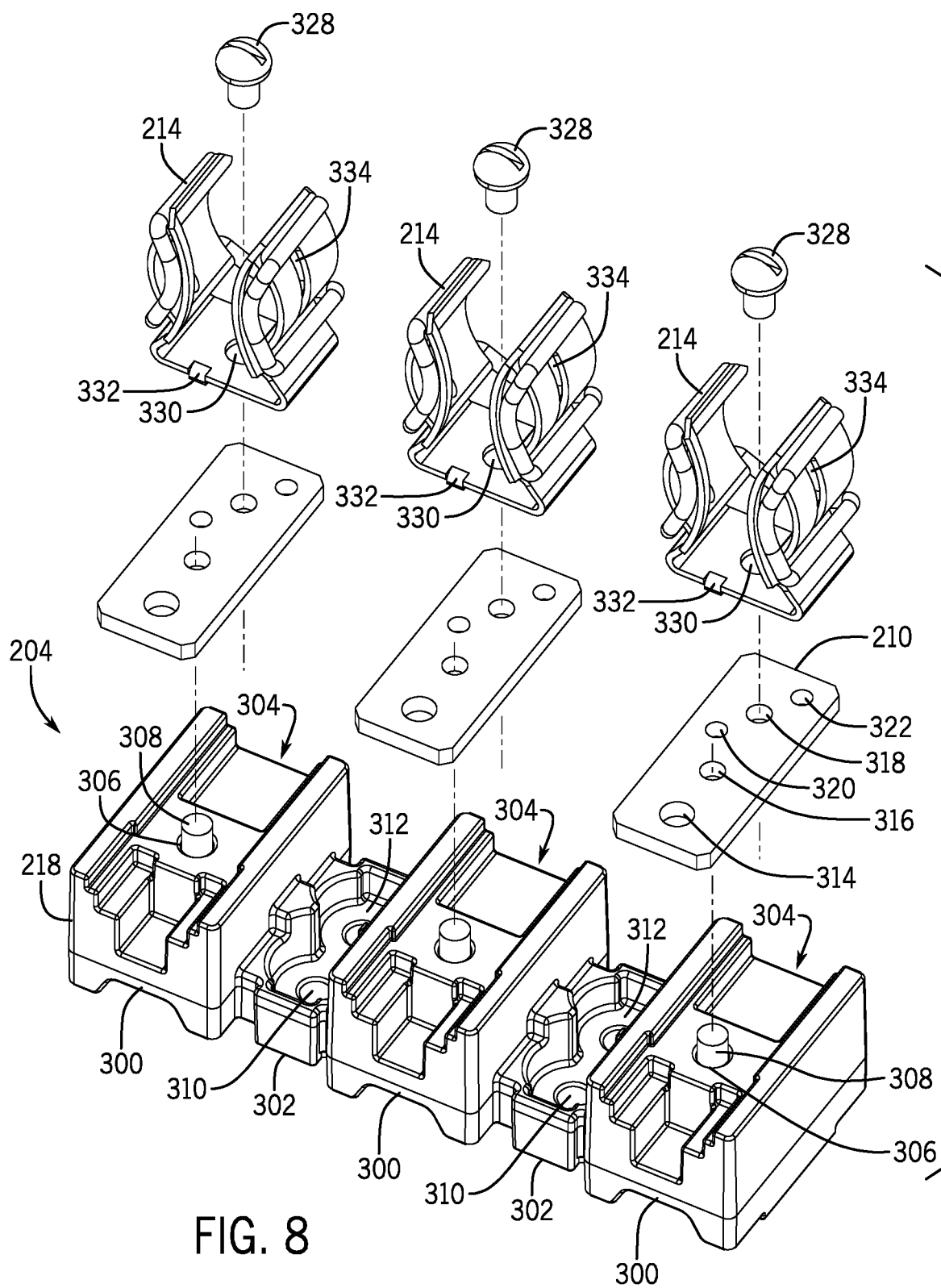
FIG. 8 illustrates an exploded perspective view of a 60 Amp fuse support block of the disconnect switch assembly shown in FIGS. 3 and 4, in accordance with embodiments presented herein.

FIG. 8 is an exploded perspective view of a 60 Amp fuse support block 204, which is an alternate embodiment of the 30 Amp fuse support block shown in FIG. 5. As with the 30 Amp embodiment, the 60 Amp fuse support block 204 includes the molding 218, three terminals 210, and three fuse interfaces 214. As shown in FIG. 8, the terminals 210 do not include the notches 326 shown in FIG. 5. Additionally, the 60 Amp fuse support block 204 does not include the connection points 222 shown in FIG. 5, as the electrical lines couple directly to the terminals 210 via ring lugs and fasteners. The 30 Amp and 60 Amp fuse support block 204 designs may share a common molding 218 design. Accordingly, the molding 218 for the 60 Amp fuse support block 204 may be made of a single part molded from a non-conductive material, such as a polymer. As with the 30 Amp fuse support block 204, the 60 Amp fuse support block 204 includes three terminals 210, one for each phase of power. As such, the molding 218 includes the first, second, and third blocks 300, which are coupled to one another by the bridges 302 disposed between the blocks 300. Each of the blocks 300 may include the recess 304 dimensioned to receive the respective terminal 210 and the aperture 306 (e.g., through hole) through which the fastener 308 (e.g., bolt) may extend to couple the terminal 210 to the block 300. Each of the bridges 302 includes the first aperture 310 and the second aperture 312, which may be used to mount the fuse support block 204 to the housing 24 in the first and second configurations, respectively.

As with the 30 Amp fuse support block 204, each terminal 210 includes the pattern of apertures to facilitate coupling the molding 218, the fuse interface 214, and the electrical line to the terminal 210 (e.g., via a ring lug and a fastener). As with the terminals 210 for the 30 Amp fuse support block 204, each of the terminals 210 for the 60 Amp fuse support block 204 include the first primary aperture 314, the second primary aperture 316, the third primary aperture 318, the first auxiliary aperture 320, and the second auxiliary aperture 322. The first primary aperture 314 may receive the fastener that couples the electrical line 208 to the terminal 210 (e.g., via a ring lug) and establishes an electrical connection between the electrical line 208 and the terminal 210 (via a ring lug). The second primary aperture 316 receives the fastener 308 extending through the aperture 306 in the block 300 to couple the terminal 210 to the block 300. The third primary aperture 318 receives the fastener 328 extending through the aperture 330 in the fuse interface 214 to couple the fuse interface 214 to the terminal 210. The first and second auxiliary apertures 320, 322 interface with the detents or protrusions 332 on the fuse interface 214 to prevent the fuse interface 214 from rotating relative to the terminal 210 and/or to key the fuse interface 214 into the desired position. The fuse interfaces 214 shown in FIG. 8 are similar to the clip-type fuse interfaces 214 for the 30 Amp fuse support block shown in FIG. 5. The fuse interfaces 214 may include the slots 334 to interface with an annular lip of the fuse 206 to position the fuse 206 axially along an axis of the fuse 206.

Figure 9:
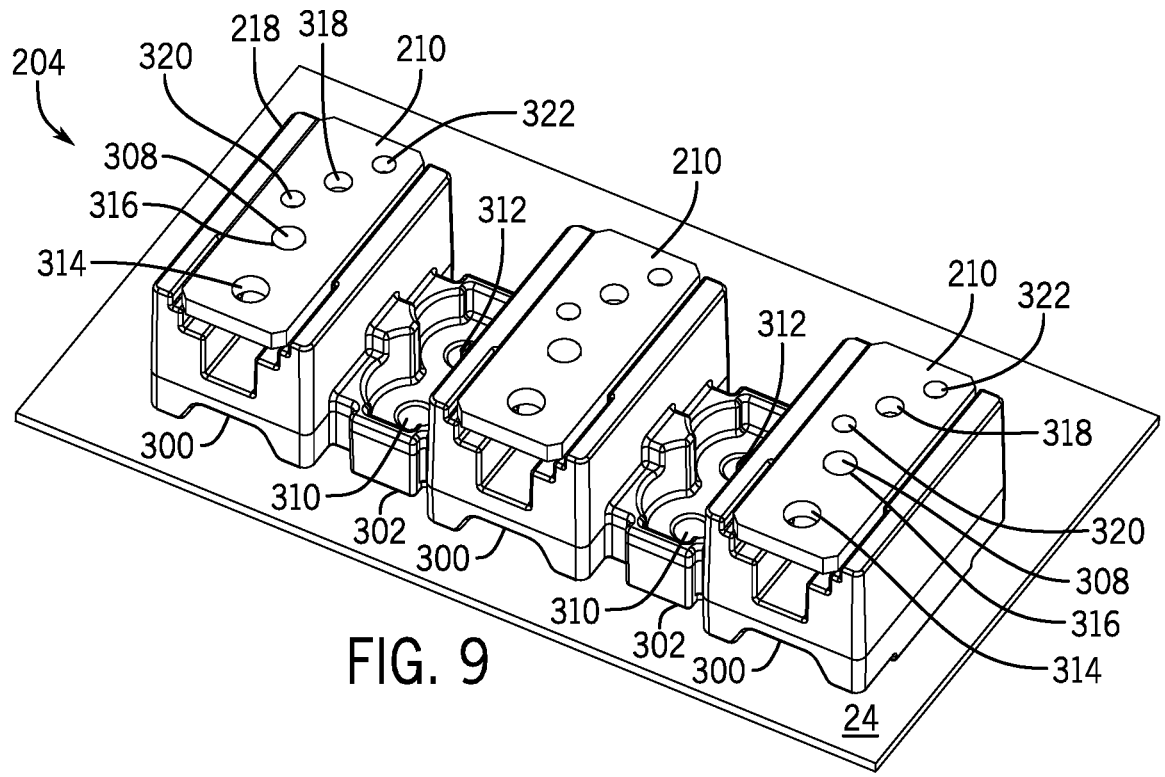
FIG. 9 illustrates a perspective view of the 60 Amp fuse support block shown in FIG. 8 installed in a first configuration, in accordance with embodiments presented herein.

FIG. 9 is a perspective view of the 60 Amp fuse support block 204 of FIG. 8 in the first configuration, without the fuse interfaces 214 shown for the sake of clarity. As shown, the terminals 210 are coupled to the molding 218 via the second primary aperture 316 of each terminal 210. Each of the electrical lines 208 (not shown) couples to the respective terminal 210 via the first primary aperture 314. The fuse support block 204 may be coupled to the housing 24 via fasteners extending through the first apertures 310 of the molding 218 and then engaging with the housing 24. As was previously shown in and described with regard to FIG. 3, when the fuse support block 204 is installed in the first configuration, the electrical lines 208 (not shown) extend outward from the fuse support block 204, opposite the direction of the fuse block 202 (not shown).

Figure 10:
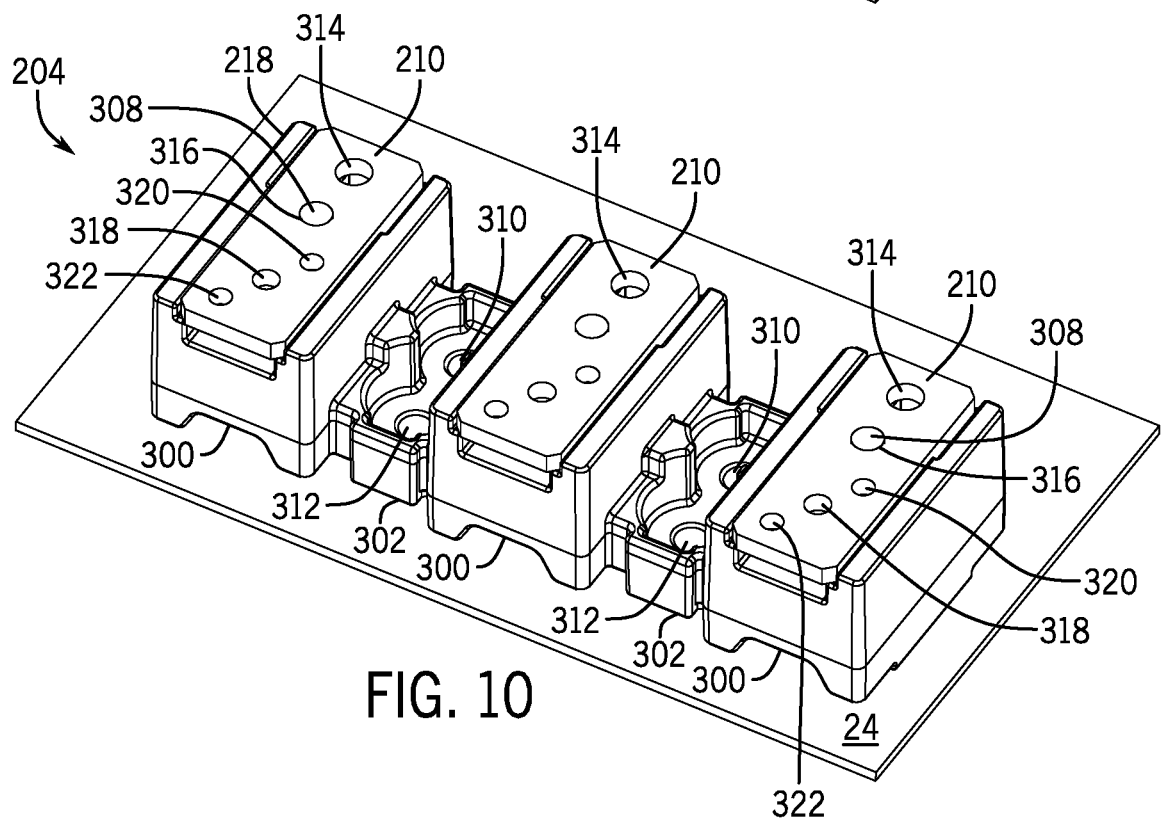
FIG. 10 illustrates a perspective view of the 60 Amp fuse support block shown in FIGS. 8 and 9 installed in a second configuration, in accordance with embodiments presented herein.

FIG. 10 is a perspective view of the 60 Amp fuse support block 204 in the second configuration, without the fuse interfaces 214 shown for the sake of clarity. Unlike the first configuration shown in FIG. 9, the fuse support block 204 may be coupled to the housing 24 via fasteners extending through the second apertures 312 of the molding 218 and then engaging with the housing 24. As was previously shown in and described with regard to FIG. 4, when the fuse support block 204 is installed in the second configuration, the electrical lines 208 (not shown) couple to the fuse support block 204 at the side that faces the fuse block 202 (not shown), such that the electrical lines 208 (not shown) extend from the fuse support block 204 substantially outward toward the fuse block 202, beneath the fuses 206, thus reducing the footprint of the disconnect switch assembly 200 relative to the first configuration.

Figure 11:
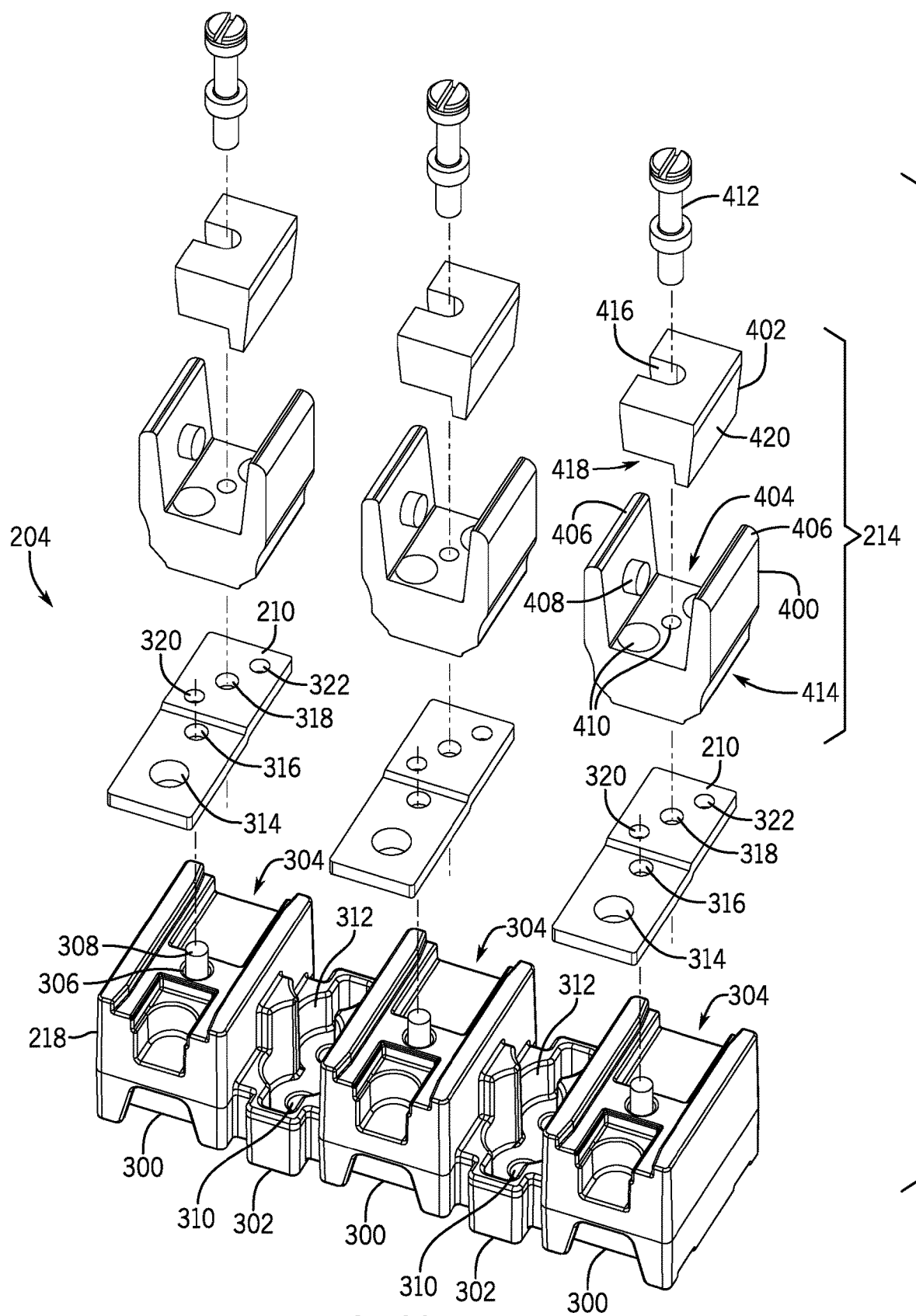
FIG. 11 illustrates an exploded perspective view of a 100 Amp fuse support block of the disconnect switch assembly shown in FIGS. 3 and 4, in accordance with embodiments presented herein.

FIG. 11 is an exploded perspective view of a 100 Amp fuse support block 204, which is an alternate embodiment of the 30 Amp fuse support block shown in FIG. 5 and the 60 Amp fuse support block shown in FIG. 8. As with the 30 Amp and 60 Amp embodiments, the 100 Amp fuse support block 204 includes the molding 218, three terminals 210, and three fuse interfaces 214. However, rather than the clip-type fuse interfaces 214 of the 30 Amp and 60 Amp fuse support blocks, the fuse interfaces 214 of the 100 Amp fuse support block are V-block type fuse interfaces 214. That is, the fuse interfaces 214 include a V-block 400 and a chuck 402. As shown, the V-block 400 includes a central channel 404, defined by walls 406, that receives the chuck 402. One or both of the walls 406 may include a protrusion or detent 408, which may assist in positioning the chuck 402 within the central channel 404. As shown, the V-block 400 may also include one or more apertures 410 for receiving a fastener 412 that couples the chuck 402 to the V-block 400 and/or that couples the V-block 400 to the terminal 210. As with the clip-type fuse interfaces 214 shown in and described with regard to FIGS. 5 and 8, the V-blocks 400 may include protrusions 332 or detents on an under side 414 of the V-block 400 that may interface with the first and second auxiliary apertures 320, 322 to position the fuse interface 214 upon the terminal 210. In other embodiments, fasteners 412 extending through the apertures 410 in the V-block 400 may be used to position the fuse interface 214 upon the terminal 210.

As shown in FIG. 11, the chuck 402 includes an aperture 416 or slot through which the fastener 412 extends when coupling the chuck 402 to the V-block 400. Additionally, the chuck 402 may include a recess 418 defined on one or both sides by a lip 420 to offset the chuck 402 from the V-block 400 and capture the respective fuse 206.

As shown in FIG. 11, the terminals 210 may be similar to the terminals 210 shown in FIG. 8 in that the terminals 210 for the 100 Amp fuse support block 204 do not include the notches 326 of the terminals for the 30 Amp fuse support block shown in FIG. 5. Additionally, as with the 60 Amp fuse support block 204, the 100 Amp fuse support block 204 does not include the connection points 222 of the 30 Amp fuse support block shown in FIG. 5. Instead, as with the 60 Amp fuse support block 204, the electrical lines 208 may couple directly to the terminals 210 via a fastener and a ring lug. The molding 218 design for the 100 Amp fuse support block may have slightly different dimensions than the moldings 218 for the 30 Amp and 60 Amp fuse support blocks. However, the molding 218 for the 100 Amp fuse support block 204 may still be made of a single part molded from a non-conductive material, such as a polymer. As with the 30 Amp and 60 Amp fuse support blocks 204, the 100 Amp fuse support block 204 includes three terminals 210, one for each phase of power. As such, the molding includes the first, second, and third blocks 300, which are coupled to one another by the bridges 302 disposed between the blocks 300. Each of the blocks 300 may include the recess 304 dimensioned to receive the respective terminal 210 and the aperture 306 (e.g., through hole) through which the fastener 308 (e.g., bolt) may extend to couple the terminal 210 to the block 300. Each of the bridges 302 includes the first aperture 310 and the second aperture 312, which may be used to mount the fuse support block 204 to the housing in the first and second configurations, respectively.

As with the 30 Amp and 60 Amp fuse support blocks 204, each terminal 210 includes the pattern of apertures to facilitate coupling the molding 218, the fuse interface 214, and the electrical line 208 to the terminal 210. As with the terminals 210 for the 30 Amp and 60 Amp fuse support blocks 204, each of the terminals 210 for the 100 Amp fuse support block 204 includes the first primary aperture 314, the second primary aperture 316, the third primary aperture 318, the first auxiliary aperture 320, and the second auxiliary aperture 322. The first primary aperture 314 may receive the fastener that couples the electrical line 208 to the terminal 210 (e.g., via the ring lug) and establishes an electrical connection between the electrical line 208 and the terminal 210. The second primary aperture 316 receives the fastener 308 extending through the aperture 306 in the block 300 to couple the terminal 210 to the block 300. The third primary aperture 318 receives the fastener 328 extending through the aperture 330 in the fuse interface 214 to couple the fuse interface 214 to the terminal 210. The first and second auxiliary apertures 320, 322 interface with the detents or protrusions 332 on the fuse interface 214 to prevent the fuse interface 214 from rotating relative to the terminal 210 and/or to key the fuse interface 214 into the desired position.

Figure 12:
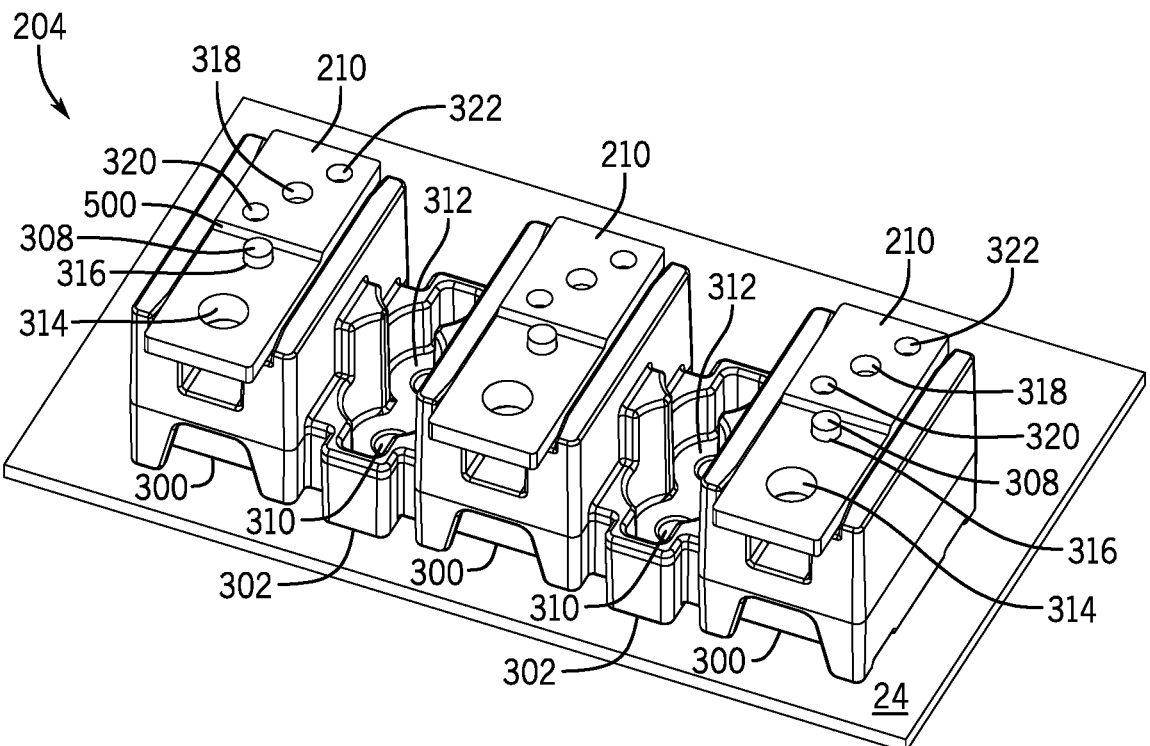
FIG. 12 illustrates a perspective view of the 100 Amp fuse support block shown in FIG. 11 installed in a first configuration, in accordance with embodiments presented herein.

FIG. 12 is a perspective view of the 100 Amp fuse support block 204 of FIG. 11 in the first configuration, without the fuse interfaces 214 shown for the sake of clarity. As shown, the terminals 210 are coupled to the molding 218 via the second primary aperture 316 of each terminal 210. In some embodiments, each of the terminals 210 may include a step 500, as shown in FIG. 12. Each of the electrical lines 208 (not shown) couples to the respective terminal 210 via first primary aperture 314 and a ring lug. The fuse support block 204 may be coupled to the housing 24 via fasteners extending through the first apertures 310 of the molding 218 and then engaging with the housing 24. As was previously shown in and described with regard to FIG. 3, when the fuse support block 204 is installed in the first configuration, the electrical lines 208 (not shown) extend outward from the fuse support block 204, opposite the direction of the fuse block 202 (not shown).

Figure 13:
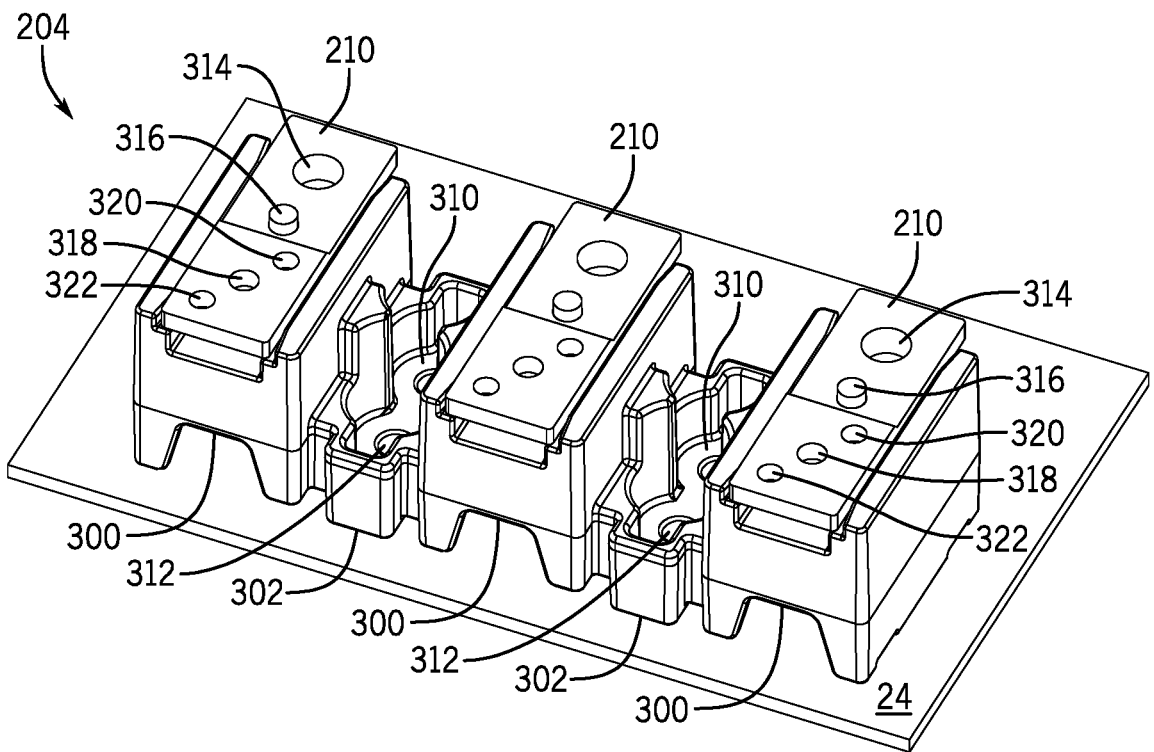
FIG. 13 illustrates a perspective view of the 100 Amp fuse support block shown in FIGS. 11 and 12 installed in a second configuration, in accordance with embodiments presented herein.

FIG. 13 is a perspective view of the 100 Amp fuse support block 204 in the second configuration, without the fuse interfaces 214 shown for the sake of clarity. Unlike the first configuration shown in FIG. 12, the fuse support block 204 may be coupled to the housing 24 via fasteners extending through the second apertures 312 of the molding 218 and then engaging with the housing 24. As was previously shown in and described with regard to FIG. 4, when the fuse support block 204 is installed in the second configuration, the electrical lines 208 (not shown) couple to the fuse support block 204 at the side that faces the fuse block 202 (not shown) such that the electrical lines 208 (not shown) extend from the fuse support block 204 substantially outward toward the fuse block 202, beneath the fuses 206, thus reducing the footprint of the disconnect switch assembly 200 relative to the first configuration.

Figure 14:
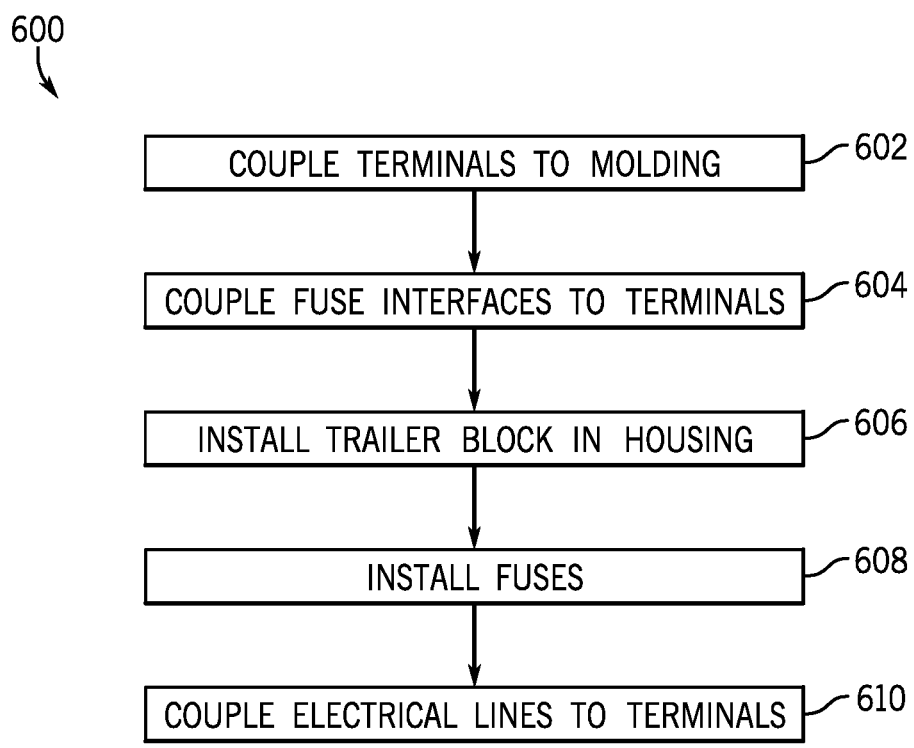
FIG. 14 illustrates a flow chart of a process for assembling and installing the fuse support block of the disconnect switch assembly, in accordance with embodiments presented herein.

FIG. 14 is a flow chart of a process 600 for assembling and installing the fuse support block 204 of the disconnect switch assembly 200. Though the following discussion is directed to assembly and installation of the fuse support block 204 of the 30 Amp disconnect switch assembly 200 depicted in FIGS. 3-7, it should be understood that similar techniques may be used for other embodiments of the fuse support block 204. At block 602, the terminals 210 are coupled to the molding 218. As previously described, a fastener 308 may extend through apertures 306 in the molding 218 and the terminals 210 in order to couple the terminals 210 to the molding 218. In some embodiments, one of the apertures 306 may include threads that engage with corresponding threads on the fastener 308 to hold the fastener 308 in place. In other embodiments, a nut may be used to engage the threads of the fastener 308 to hold the fastener 308 in place.

At block 604, the fuse interfaces 214 are coupled to the terminals 210. As previously described, fasteners 308 may extend through corresponding apertures 306 in the fuse interfaces 214, the terminals 210, and in some cases the molding 218, to couple the fuse interfaces 214 to the terminals 210. Additionally, the protrusions 332 or detents of the fuse interfaces 214 may engage with the corresponding apertures 320, 322 in the terminals 210 to position the fuse interfaces 214 on the terminals 210 and prevent movement of the fuse interfaces 214 after they are installed. As previously described, the fuse interfaces 214 may be coupled to the terminals 210 in one of two positions depending upon whether the fuse support block 204 is to be installed in the first position or the second position. The fuse interfaces 214 may be clip-type fuse interfaces, V-block fuse interfaces, or some other type of fuse interface.

At block 606, the fuse support block 204 is installed in the housing 24. To install the fuse support block 204 in the first configuration, the first set of apertures 310 may be aligned with corresponding apertures of the housing 24, such that the first primary apertures 314 of the terminals 210 face away from the fuse block 202. Fasteners may extend through the apertures 310 and couple the fuse support block to the housing 24. To install the fuse support block 204 in the second configuration, the second set of apertures 312 should be aligned with corresponding apertures of the housing 24, such that the first primary apertures 314 of the terminals 210 face toward the fuse block 202. Fasteners may extend through the apertures 312 and couple the fuse support block 204 to the housing 24.

At block 608, fuses 206 are installed in each of the respective sets of fuse interfaces 214 disposed on the fuse block 202 and the fuse support block 204. At block 610, the electrical lines 208 may be coupled to the respective terminals 210 at the first primary apertures 314. In some embodiments (e.g., 30 Amp fuse support block 204), connection points 222 and fasteners 324 may be used to connect the electrical lines 208 to the terminals 210. In other embodiments (e.g., 60 Amp and 100 Amp fuse support blocks 204), ring lugs and fasteners may be used to connect the electrical lines 208 to the terminals 210.

The disclosed techniques include a reversible fuse support block for a disconnect switch assembly that can be mounted in a first configuration having a normal-sized footprint, or a second configuration having a reduced footprint. Specifically, the fuse support block includes a molding having two sets of mounting holes that allow the molding to be installed within the housing in two different positions (e.g., for first configuration and second configuration). The fuse support block includes one or more terminals, each having a pattern of apertures, which mount to the molding. One or more fuse interfaces couple to respective terminals in two possible positions, a first position for the first configuration, and a second position for the second configuration. When the fuse interfaces are installed in the first position and the molding is installed in the first position, the fuse interfaces are disposed in substantially the same position relative to corresponding fuse interfaces on a fuse support block as when the fuse interfaces are installed in the second position and the molding is installed in the second position. Accordingly, when the fuse support block is installed in the second position, electrical lines coupling the fuse support block to the power source extend from the fuse support block underneath the fuses rather than extending outward from the side of the fuse support block opposite the fuses. Thus, the second configuration reduces the footprint of the disconnect switch assembly relative to the first configuration.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A reversible fuse support block for a switch disconnect assembly, comprising:
   a molding configured to be installed within a housing of the switch disconnect assembly in a first position and a second position, wherein the second position is rotated 180 degrees relative to the first position;
   a first terminal configured to couple to the molding, wherein the first terminal comprises a plurality of apertures disposed in a pattern; and a first fuse interface comprising:
  a chuck; and
  a v-block having a channel configured to receive the chuck, wherein the chuck and the v-block are configured to capture a first end of a fuse, wherein the first fuse interface is configured to couple to the first terminal in a first arrangement and a second arrangement such that when the first fuse interface is installed in the first arrangement and the molding is installed in the first position, the first fuse interface is disposed in substantially the same position relative to a second fuse interface on a fuse block of the switch disconnect assembly positioned within the housing, opposite the fuse support block, as when the first fuse interface is installed in the second arrangement and the molding is installed in the second position.

2. The reversible fuse support block of claim 1, wherein the fuse support block is configured to receive an electrical line, wherein the electrical line is configured to electrically couple the first terminal to a power supply, and wherein the electrical line is coupled to the first terminal via a connection point.

3. The reversible fuse support block of claim 1, wherein the v-block is configured to receive a fastener extending through the chuck to capture the first end of the fuse.

4. The reversible fuse support block of claim 1, wherein the disconnect switch assembly is rated for 100 Amps.

5. The reversible fuse support block of claim 1, wherein, when the molding is installed in the second position, an electrical line extends from the fuse support block, beneath the fuse extending between the fuse support block and the fuse block.

6. The reversible fuse support block of claim 1, wherein the molding comprises:
  a first terminal block configured to receive the first terminal;
  a second terminal block configured to receive a second terminal; and
  a bridge extending between the first terminal block and the second terminal block.

7. The reversible fuse support block of claim 6, wherein the bridge comprises:
  a first aperture configured to receive a fastener when the molding is installed in the first position; and
  a second aperture configured to receive the fastener when the molding is installed in the second position.

8. The reversible fuse support block of claim 6, comprising the second terminal, wherein the second terminal comprises a second plurality of apertures disposed in the pattern.

9. A method of installing a fuse support block for a switch disconnect assembly, comprising:
  coupling a terminal to a molding, wherein the molding is configured to be installed within a housing of the switch disconnect assembly in a first position and a second position, and wherein the terminal comprises a plurality of apertures disposed in a pattern;
  coupling a first fuse interface to the terminal, wherein the first fuse interface comprises a chuck and a v-block having a channel configured to receive the chuck, wherein the chuck and the v-block are configured to capture a first end of a fuse, wherein the first fuse interface is configured to couple to the terminal in a first arrangement and a second arrangement such that when the first fuse interface is installed in the first arrangement and the molding is installed in the first position, the first fuse interface is disposed in substantially the same position relative to a second fuse interface on a fuse block of the switch disconnect assembly positioned within the housing, opposite the fuse support block, as when the first fuse interface is installed in the second arrangement and the molding is installed in the second position; and
  installing the molding in the housing.

10. The method of claim 9, wherein the molding is installed in the first position.

11. The method of claim 9, wherein the molding is installed in the second position.

12. The method of claim 9, comprising coupling an electrical line to the terminal via a connection point, wherein the electrical line is configured to electrically couple the terminal to a power supply.

13. The method of claim 9, wherein the disconnect switch assembly is rated for 100 Amps.

14. An industrial automation system, comprising:
  a power supply;
  an industrial automation motor starter configured to receive power from the power supply;
  a disconnect switch assembly configured to electrically couple the power supply to the industrial automation motor starter, the disconnect switch assembly comprising:
    a housing;
    a fuse block disposed within the housing, the fuse block comprising a first fuse interface configured to receive a first end of a fuse;
    a reversible fuse support block disposed within the housing, opposite the fuse block, the reversible fuse support block comprising:
      a molding configured to be installed within the housing in a first position and a second position, wherein the second position is rotated 180 degrees relative to the first position;
      a first terminal configured to couple to the molding, wherein the first terminal comprises a plurality of apertures disposed in a pattern; and
      a second fuse interface comprising a chuck and a v-block having a channel configured to receive the chuck, wherein the chuck and the v-block are configured to capture a second end of the fuse, wherein the second fuse interface is configured to couple to the first terminal in a first arrangement and a second arrangement such that when the second fuse interface is installed in the first arrangement and the molding is installed in the first position, the second fuse interface is disposed in substantially the same position relative to the first fuse interface as when the second fuse interface is installed in the second arrangement and the molding is installed in the second position.

15. The industrial automation system of claim 14, wherein the molding of the reversible fuse support block comprises:
  a first terminal block configured to receive the first terminal;
  a second terminal block configured to receive a second terminal; and
  a bridge extending between the first terminal block and the second terminal block.

16. The industrial automation system of claim 15, wherein the bridge comprises:
  a first aperture configured to receive a fastener when the molding is installed in the first position; and
  a second aperture configured to receive the fastener when the molding is installed in the second position.

17. The industrial automation system of claim 15, wherein the reversible fuse support block comprises the second terminal, wherein the second terminal comprises a second plurality of apertures disposed in the pattern.

18. The industrial automation system of claim 14, comprising an electrical line extending from the fuse support block toward the fuse block, beneath the fuse extending between the fuse support block and the fuse block when the molding is installed in the second position.

19. The industrial automation system of claim 14, comprising an electrical line extending from the fuse support block, away from the fuse block and toward a wall of the housing, when the molding is installed in the first position.

20. The industrial automation system of claim 14, comprising a fuse insulation component disposed about the first fuse interface, the second fuse interface, or both.

\* \* \* \* \*